M. & E. M. DEILLER.
TOBACCO STRIPPING AND BOOKING MACHINE.
APPLICATION FILED MAR. 10, 1910.
985,984.
Patented Mar. 7, 1911.
6 SHEETS—SHEET 4.
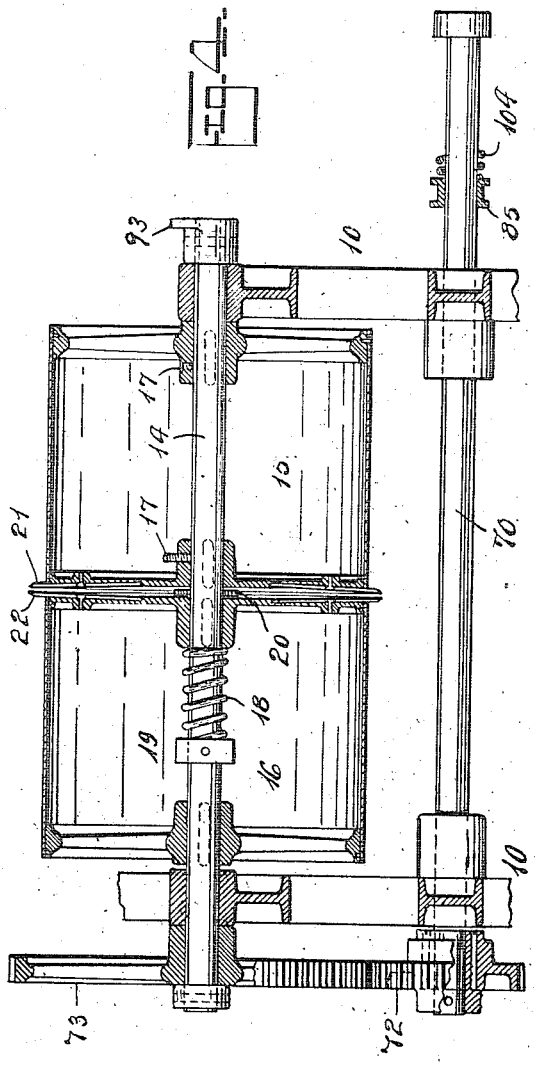
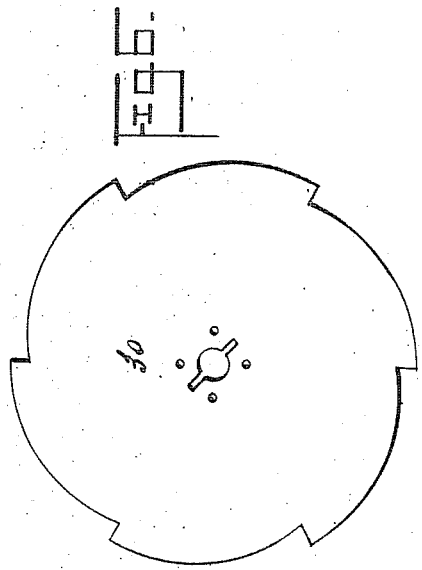
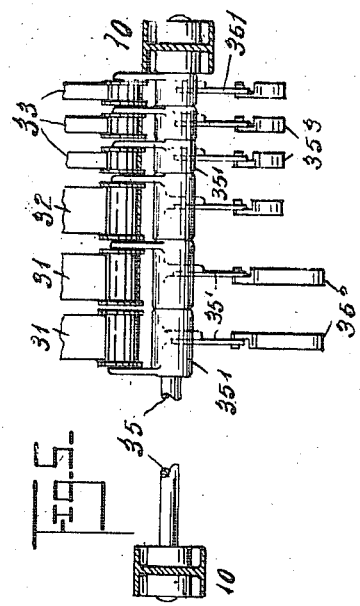
WITNESSES.
INVENTORS
BY
ATTORNEY.

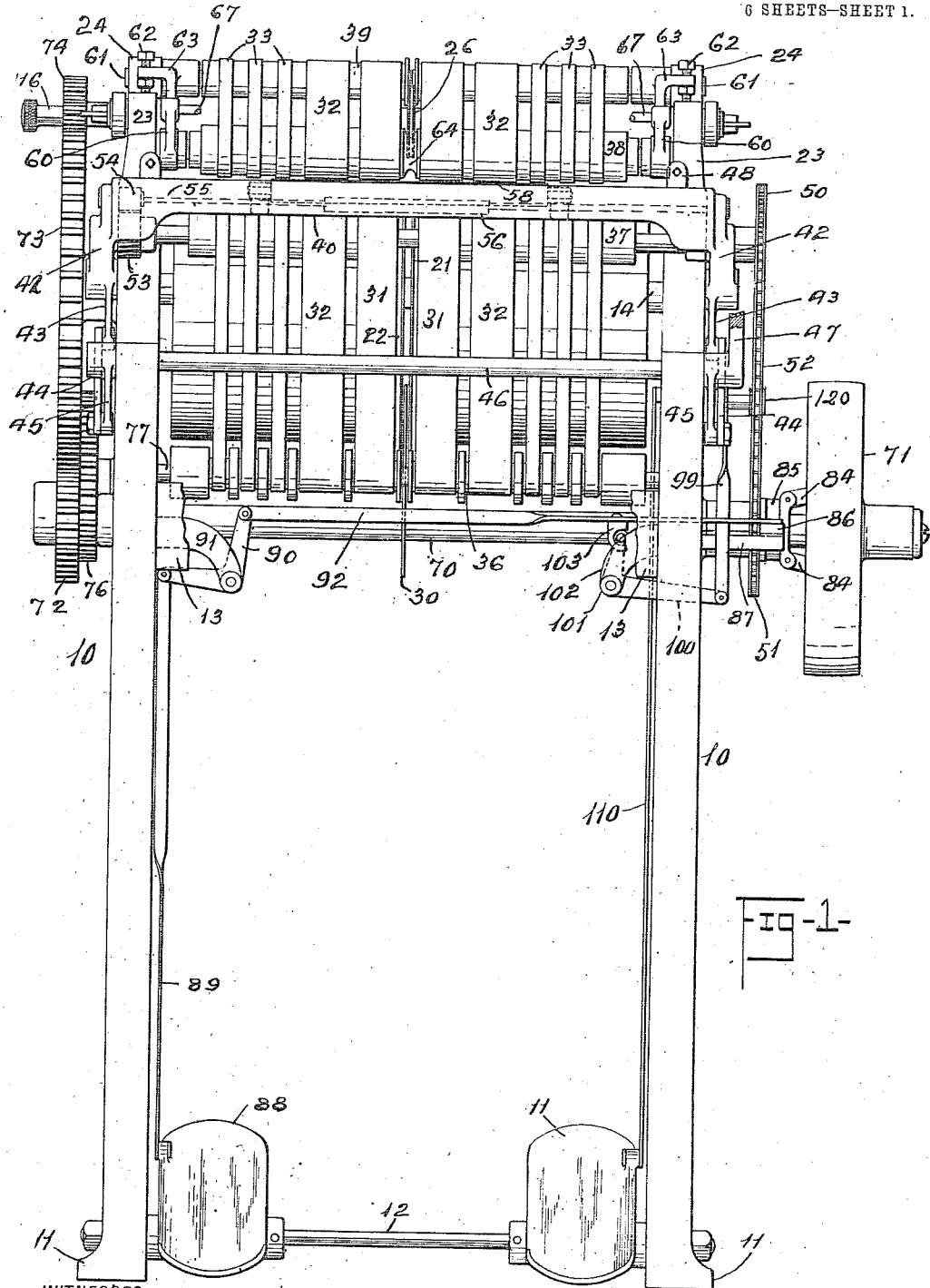

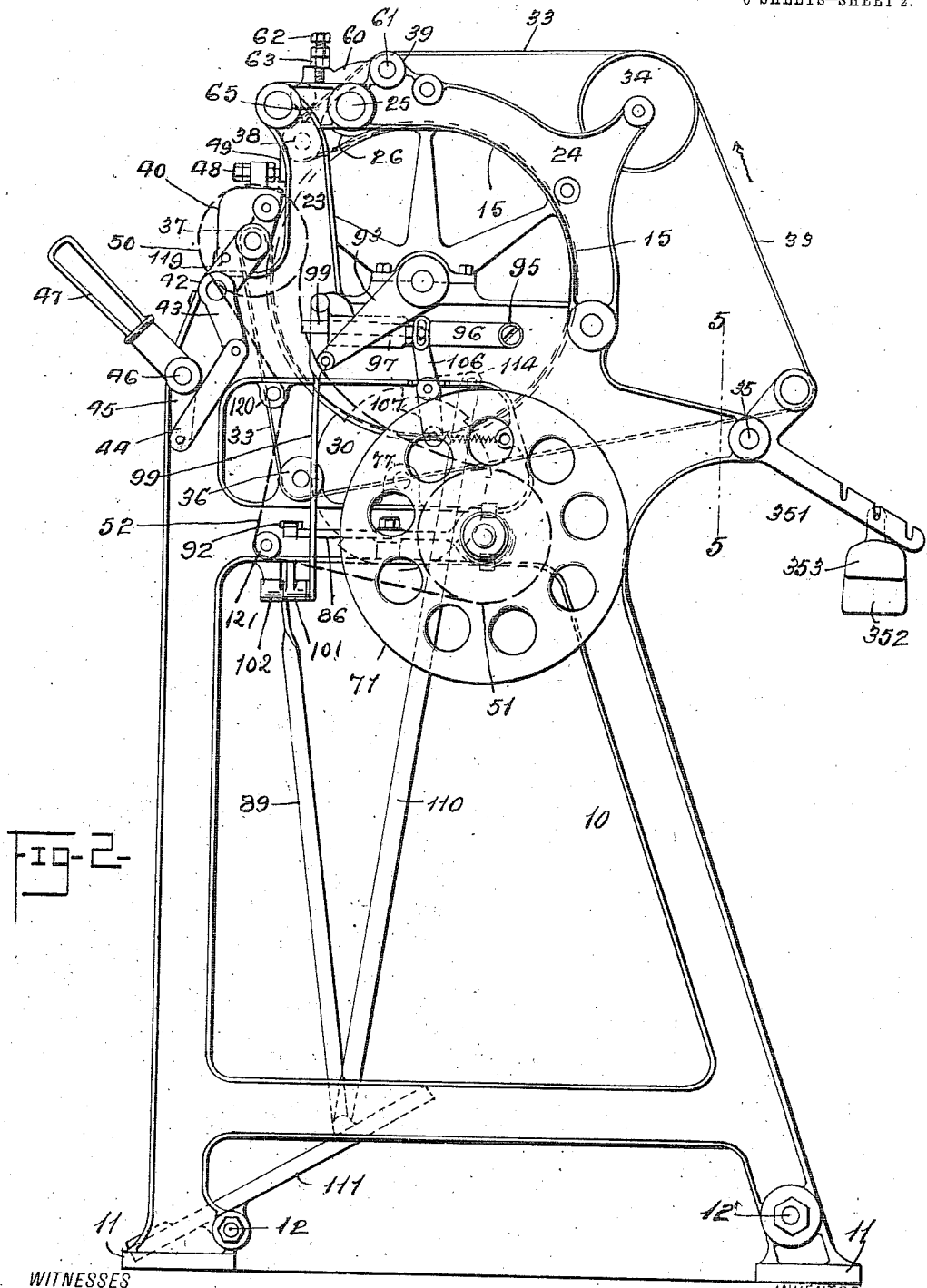

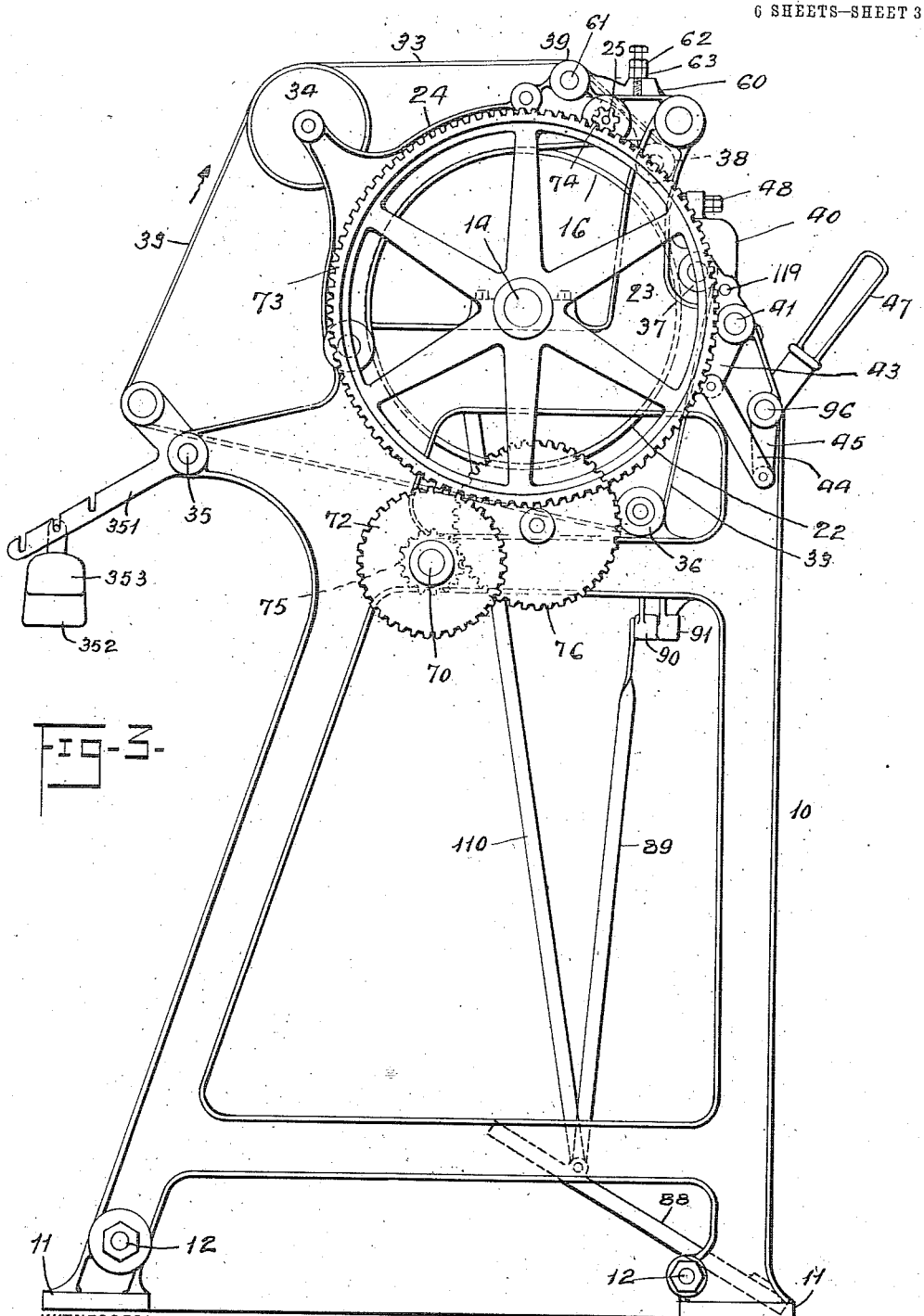

M. & E. M. DEILLER.
TOBACCO STRIPPING AND BOOKING MACHINE.
APPLICATION FILED MAR. 10, 1910.
985,984.
Patented Mar. 7, 1911
6 SHEETS—SHEET 5.
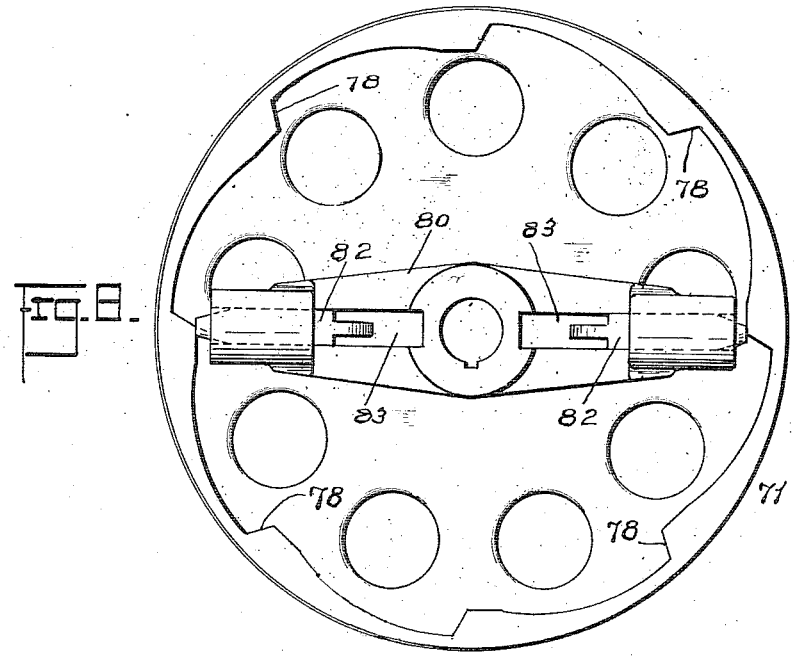
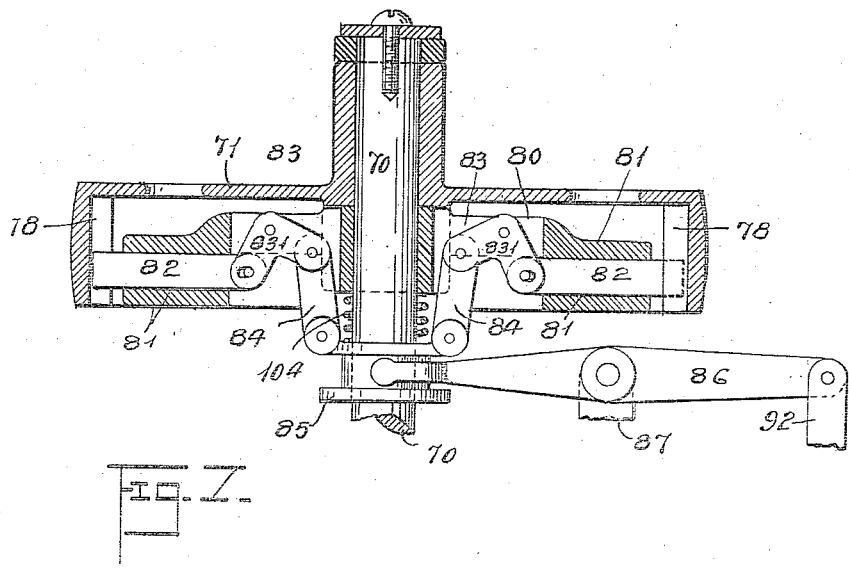
WITNESSES
Frederick Germann Jr.
Charles P. Day.
INVENTORS
Martin Deiller,
Eugene M. Deiller,
BY
Russell M. Everett,
ATTORNEY.

M. & E. M. DEILLER.
TOBACCO STRIPPING AND BOOKING MACHINE.
APPLICATION FILED MAR. 10, 1910.
985,984.
Patented Mar. 7, 1911.
6 SHEETS—SHEET 6.
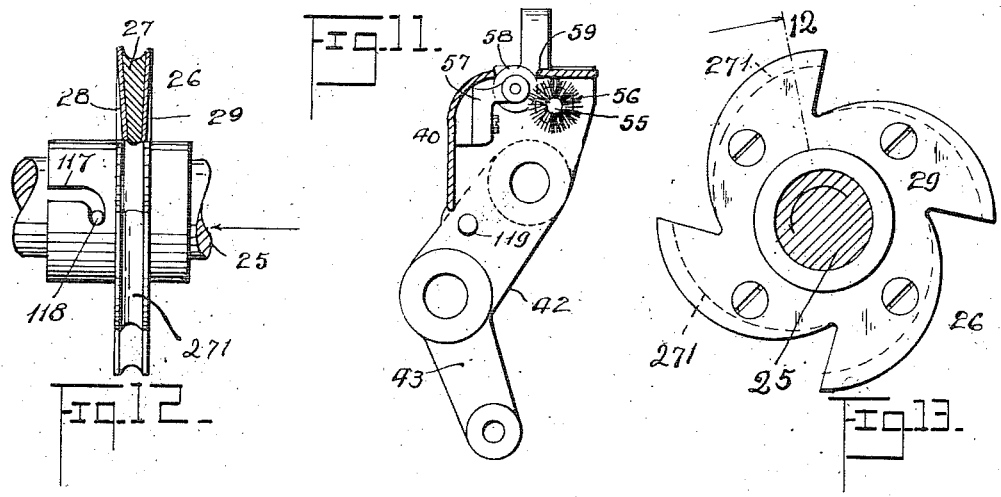
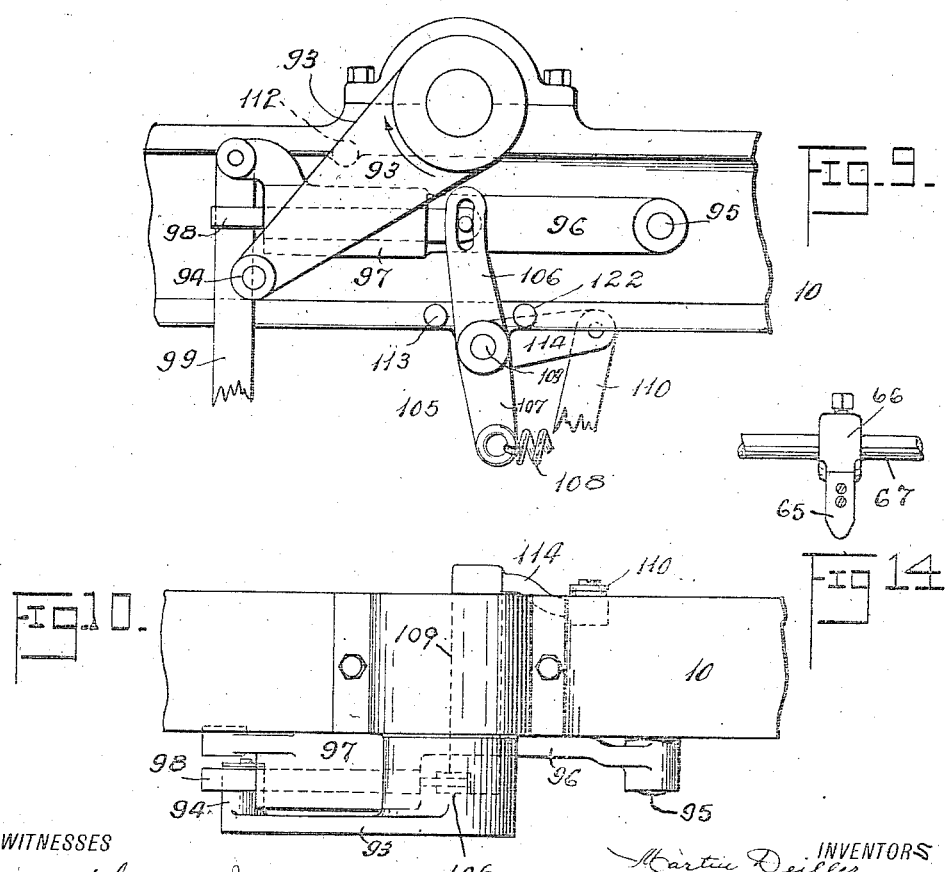
WITNESSES
Frederick Germano Jr.
Charles P. Day
INVENTORS
Martin Deiller
Eugene M. Deiller
BY
Russell M. Everett
ATTORNEY.

UNITED STATES PATENT OFFICE.

MARTIN DEILLER AND EUGENE M. DEILLER, OF NEWARK, NEW JERSEY, ASSIGNORS TO DEILLER MACHINE COMPANY, A CORPORATION OF NEW JERSEY.

TOBACCO STRIPPING AND BOOKING MACHINE.

985,984.  Specification of Letters Patent.  Patented Mar. 7, 1911.

Application filed March 10, 1910. Serial No. 548,340.

*To all whom it may concern:*

Be it known that we, MARTIN DEILLER and EUGENE M. DEILLER, citizens of the United States, residing at Newark, in the county of Essex and State of New Jersey, have invented certain Improvements in Tobacco Stripping and Booking Machines, of which the following is a specification.

The objects of this invention are to provide a machine which will perfectly strip tobacco leaves and book them at the same time.

The principle of the invention is as follows: The tapering stem or mid-rib of a tobacco leaf, for a considerable portion of its length from point to butt, is longitudinally creased or folded. By stretching the leaf transversely, this fold may be flattened out, so that the width of this portion of the stem may thus be increased and approximated to that of the thick or butt portion of the stem which is sufficiently solid to resist such strain. In this way, the width of the whole stem is made so nearly uniform, that if the stretched leaf be divided by two parallel cuts respectively on opposite sides of the stem, and separated by a distance equal to the width of said thick or butt portion, the amount of leaf left on the stem, even near the point thereof, will be practically inconsiderable: or, in other words, the stemming of the leaf will be accomplished without substantial loss.

In order to carry this principle into useful effect, we have devised an apparatus, hereinafter set forth, in which we have provided a rotary drum having parallel circumferential flanges with cutting edges, which flanges are suitably spaced to admit between them the thick or butt portion of the stem. The leaf, as it is fed to the drum preferably point foremost, is stretched transversely over these flanges by means of leather belts which press down with an elastic pressure the portions of the leaf immediately adjacent to said flanges against the drum periphery, thus flattening out the fold in the stem. While stretched, the leaf is divided on each side of the stem by the shearing action of a rotary cutter coöperating with both of said flanges. The stem then falls from the machine, and the divided sections of the leaf may either be removed at once, or left, with subsequently stemmed sections, to accumulate on the drum for purposes hereinafter explained.

The invention further consists in the construction, whereby the drum is driven at a speed proportional to the thickness of the book of leaves allowed to accumulate therein; whereby the parts of the machine are rendered readily accessible, and also simplified; whereby the cutting edges which divide the leaf are kept sharp, and whereby certain other advantages are gained, as more particularly hereinafter set forth.

Referring to the accompanying drawings, in which like numerals of reference indicate corresponding parts in each of the several figures, Figure 1 is an elevation of our improved machine from the front or position occupied by the operator; Fig. 2 is an elevation of the side of the machine at the right hand of the operator, or side to which power is applied, the driving chain and sprockets being indicated by heavy broken lines for greater clearness; Fig. 3 is an elevation of the opposite or left hand side of the machine; Fig. 4 is a vertical section taken centrally through the drum and frame of the machine, and showing the driving shaft in the rear; Fig. 5 is a section taken on line 5—5, Fig. 2, looking rearwardly, part of the belt-holding arms at the left-hand half of the figure being omitted; Fig. 6 is a side view of the rotary stem ejector; Fig. 7 is a central section of certain clutch means upon the outer end of the driving shaft, looking from the machine toward the outer end of the shaft; Fig. 8 is an elevation of the two members of said clutch, viewed from the side of the clutch next the machine; Fig. 9 is a detail elevation of certain means for controlling the rotation of the drum; Fig. 10 is a plan of the same; Fig. 11 is a transverse section of the pivotal apron at the front of the machine, detached; Fig. 12 is an edge view of the rotary knife for cutting out the stems of the tobacco leaves, partly in section on line 12 of Fig. 13, looking in the direction indicated by the arrow, and Fig. 13 is a side view of the same, looking along the arrow in Fig. 12; Fig. 14 is a detail front view of the cleaning finger which is broken away in Fig. 1 for greater clearness.

In said drawings, 10, 10 indicate the side frames of the machine which stand vertically at opposite sides thereof, extending from front to rear, the lower parts of said frames forming legs of any suitable height and feet 11 adapted to be secured to the floor, and the upper part of the frames providing bearings for the shafts and other parts hereinafter described. Tie rods 12 and braces 13 of any ordinary construction serve to hold the frames in rigid relation. At the tops of the said side frames 10, 10 is journaled a transverse shaft 14, and fast upon said shaft between the side frames is the drum or cylinder upon the outer surface of which the tobacco leaves after being stripped are booked. This drum is divided transversely at its middle into halves 15, 16, each composed of end wheels whose hubs are keyed to the shaft 14 and upon the peripheries of which wheels is secured at its opposite ends the cylindrical band of sheet metal or the like which forms the drum surface. The drum section 15 is held against sliding by means of set screws 17, and the other drum section 16 is forced toward the first-mentioned drum section 15 by a spring 18 upon the shaft 14 acting against a fixed collar 19. Preferably the two drum sections are prevented from coming in actual contact by means of a washer 20 between them. Upon the adjacent ends of the drum sections 15 and 16 are flanges 21 and 22 which are sharpened to knife edges by beveling their opposite outer edges. Said flanges 21, 22 are dished, as shown in Fig. 4, so that the space between them narrows radially outward.

At the front of the machine are extensions 23, 23 upon the side frames 10, 10 which extend upward above the drum described, and from said extensions supplemental frame-pieces 24 extend backward and downward to the rear part of the frames, in the same planes therewith, and which supplemental pieces afford bearings for various parts of the machine hereinafter described. Near the said upward extensions 23, and thus near the front of the machine, the supplemental pieces 24 have bearings for a shaft 25 having fast upon the middle of itself a cutter 26 adapted to work between the annular flanges 21 and 22 of the drum, above described. Said cutter comprises a suitable hub on which is a toothed disk 27, the forward or cutting faces of the teeth being curved eccentric to the center of the cutter, as clearly shown in Fig. 13. Upon the sides of said disk 27 are secured thin steel blades 28, 29 of the same shape, and for a considerable distance back from the point of each tooth or blade, the disk 27 is grooved between the blades 28, 29, as at 271, to fit against the stem of the tobacco leaf. It will be understood that the cutter just described projects between the drum sections 15, 16 and that as it rotates its blades shear against the sharpened projecting flanges 21 and 22 of the drum sections. The leaf is fed onto the drum, tip first and stem preferably downward, said stem being directly between the grooved edge of the cutter and the slot or space between the drum sections. Said cutter thus severs the leaf along each side of the stem closely adjacent thereto and forces the stem down between the drum sections. Preferably a rotary toothed stem-ejector 30 is placed between the drum sections at a lower point to insure that the stems are positively thrown out and down beneath the machine.

Against the outside of the drum, and nearly for its entire circumference, except a narrow portion at the upper part of the drum at the front of the machine where the leaves are fed in, lie the belts which frictionally engage said drum and are endless, being also carried around rollers stationed at a distance from the drum as will next be described. The belts immediately adjacent to the cutting flanges of the drum are preferably of leather, as 31, while the others are of webbing or the like, one on each drum section next to the leather belts 31 being of about the same width therewith, as 32, 32, and there being several outer ones 33 which are much narrower. Any number of belts may be used, however, and they may be of any width desired.

Particular attention is called to the relation of the belts 31 to the drum cutting flanges 21, 22, and the effect thereof upon the leaf. The leaf is presented preferably point foremost, with the stem directly over the flanges. As the leaf moves forward, the belts 31 engage it on each side of the flanges and close to them. As the belts force the portions of the leaf immediately adjacent to the cutting edges of the flanges downward toward the drum, and finally clamp these portions against the drum, they stretch the intervening part of the leaf which lies across the flanges and over the gap between them. This stretching opens the longitudinal fold in the stem, thus flattening the stem, and increasing its width. As soon as the leaf is thus stretched, it is acted on by the rotary cutter, which, coacting with the sharp edges of the flanges 21, 22, produces two parallel cuts on opposite sides of the stem. But because the otherwise narrow part of the stem toward the point has been stretched to widen the stem before the cuts are made, the width of the whole stem is substantially equalized, so that the amount of leaf left on said stem becomes inconsiderable. The stretching operation flattens all that part of the stem in which the fold exists, and does not, of course, widen the normally solid unfolded or butt part. The flanges are set at a suitable distance apart to permit this butt portion to enter between them.

It is important that the belts 31 should not be stiff or rigid, as, in such case, their edges are apt to break or cut the leaf at the angle between flange and drum surface. They are best made of soft leather which will bend upward slightly at said angle. Attention is also called to the dished shape of the drum flanges, and to the inward beveling on their outer circumferential edges to produce the cutting edges. This eliminates the sharp angles on the outer faces of the flanges, and permits the leaf to be effectively stretched over a substantially rounded surface.

The supplemental frame pieces 24 have between themselves at the rear upper part of the machine a roller 34 over which the said belts extend downwardly to individual rollers on bell-crank levers 351, then over individual rollers on a shaft 35, then forwardly to a roller 36 mounted in the main frame, then upwardly over a roller 37 in front of the drum and in the apron hereinafter described, then downwardly around the drum in contact therewith, to a roller 38 at the front upper part of the machine, and then upward over a roller 39 mounted in the supplemental pieces 24 and backward to the roller 34 with which we started. It will be understood that the tobacco leaves as they are stripped run in between the belts and drum and are held in place upon the drum by said belts. The drum is of suitable circumference so that the leaves reach not quite around the same, and as the drum is always in the same position when a leaf is inserted, the leaves are superposed or booked one above another, the belts holding them against the drum. Said drum is driven or rotated only by the contact with it of the belts which have been described, and obviously as the books of leaves increase in thickness the drum can change its speed accordingly, so that there is no creeping or displacement of successive leaves. Furthermore, the axial line of the drum is fixed, so that there is no disturbance of the books by movement of the drum other than its rotation. The individual rollers at the rear of the machine for the belts are mounted each on the upper arm of a bell crank lever 351, all of said levers being pivoted upon a shaft 35 in the side frames 10, 10, and the lower arms of the bell crank levers being adapted to receive each an adjustable weight 352 or 353. This device will hold the belts each individually at the same tension irrespective of the number of leaves upon the drum or by suitably adjusting individual weights, any desired belt or belts may be given a tension different from that of the other belts.

The roller 37 for the belts at the lower part of the front of the machine is mounted in an apron 40 which extends across the front of the machine and is hinged at the opposite sides thereof upon studs 41 to the side frames 10, 10. The end pieces 42 of this apron have downwardly extending arms 43, outside the side frames, and these arms are connected by links 44 to other arms 45 fast upon opposite ends of a transverse shaft 46 extending between the side frames. Said shaft 46 is provided at a convenient point of its length with a handle 47 by means of which it can be oscillated to swing the apron 40 toward and away from the drum. Adjustable screws 48 at the top of the apron engage stops 49 on the upward extensions 23 of the side frames to limit its approach toward the drum. Ordinarily the said apron lies against the drum as shown in the drawing, but when desired it can be tipped away to provide freer access, as for removing completed books. The said roller 37 is the driving roller for the belts, and receives its motion through a sprocket wheel 50 upon its shaft in alinement with another sprocket 51 upon the main driving shaft, a chain 52 connecting said two sprocket wheels. Said belt roller 37 at its opposite end has a gear 53 which meshes with a gear 54 on a shaft 55 extending longitudinally of the apron within the same and carrying a roller brush 56 which engages the top of the roller 37 and belts thereon, and rotates in the opposite direction, so as to prevent any tendency of the leaves after passing around the drum to follow the belt around the roller 37 instead of remaining laid against the drum. The apron 40 has also upon its inner surface brackets 57, 57, in which is mounted an idle roller 58 whose top projects through a slot 59 in the upper shelf-like surface of the apron over which the tobacco leaves slide in inserting them to the machine.

The roller 38 at the upper front part of the machine and around which the belts turn to run backwardly over the drum, is preferably mounted at its opposite ends in brackets 60, 60, which lie between the supplemental frame pieces 24, 24 and are pivoted thereto at their upper ends as upon the shaft 61 which also carries the roller or rollers 39. These brackets normally hang downward to hold the belt against the drum, but if occasion demands they can be swung upward to tip the belt away from that part of the drum and provide freer access thereto. A limit or stop to downward movement of the brackets 60 is provided by adjustable screws 62 working through lugs 63 of the bracket and adapted to engage the frame pieces 24. The roller 38 has at its middle an annular groove 64 opposite the cutting flanges on the drum, and which groove receives the stem of each tobacco leaf to get it in alinement with the rotary cutter directly behind and guide it to said cutter. In order to keep this groove perfectly clean and clear at all times a scraping finger 65 projects into the same, said finger being carried by a collar 66 fast on a bar or rod 67 extending between the brackets 60, 60.

The driving shaft 70 is journaled in the side frames 10, 10, below the drum and belt, and carries at its projecting end at the right hand side of the machine a belt pulley 71. At the opposite or left hand side of the machine said driving shaft 70 has fast upon itself a gear wheel 72 which meshes into a large gear 73 loose on the drum shaft 14, said large gear meshing at its upper part with a pinion 74 on the cutter shaft 25. The driving shaft 70 also has adjacent to the gear wheel 72 another gear 75 fast upon itself which drives a gear 76 on the shaft 77 of the stem ejector 30. Said ejector and the cutter are thus driven from the driving shaft 70.

The pulley 71 is loose upon the driving shaft 70, and is hollowed at its side next the machine to receive clutch means, next to be described, which are rotatably fast upon the driving shaft 70 and adapted to engage projections or teeth 78 upon the inner surface of the annular portion of the pulley. The clutch member which is rotatably fast upon the shaft comprises a cross arm 80 which is keyed to the shaft 70 and provides at its opposite ends, lying within the pulley 71, radially disposed slideways 81 for the dogs 82. Between said slideways 81 and the hub of the cross arm 80, the cross arm has radial slots 83 in each of which is pivoted a bell-crank lever 831 one end of which connects to the end of the dog 82 and the other end of which bell crank lever is connected, as by link 84, to a sliding sleeve 85 on the driving shaft 70 between the pulley 71 and the sprocket 51. It will be understood that there are two dogs 82 diametrically opposite each other and each connected as described to the sleeve 85. Said sleeve has an exterior annular groove, which receives the forked end of a lever 86, fulcrumed to swing in a horizontal plane upon a lug 87 at the inner side of the side frame 10. As the sleeve 85 slides away from the pulley 71, obviously the dogs 82 are moved into clutching engagement with the said pulley, and on the other hand as said sleeve 85 is forced toward the pulley 71, said dogs are withdrawn in radial directions out of engagement with the projections or teeth 78 of the pulley.

A spiral spring 104 upon the shaft 70 between the cross arm 80 and sleeve 85 normally holds said sleeve away from the cross arm and the clutch thus in engagement so that the pulley 71 turns the shaft 70 and thus drives the various parts of the machine, as has been described. For stopping the machine at any time, a treadle 88 is provided near the left-hand lower part of the frame of the machine, and from which treadle a connecting rod 89 extends upward to a bell-crank lever 90 fulcrumed upon a bracket 91, the arm of said bell-crank lever which is pivoted to the connecting rod being substantially horizontal and projecting toward the left-hand, as shown in Fig. 1, while the other arm is substantially vertical and projects upward. Said second arm is pivotally connected, as by a rod 92, to the forked lever 86 which engages the sleeve 85, and thus as the treadle 88 is depressed, the connecting rod 92 is slid toward the left hand of the operator and the lever 86 swung to disengage the clutch and thus stop the machine. The machine is thus at all times under instant control of the operator, so that if a leaf starts wrong or gets to going wrong while being inserted, he can instantly stop the drum and belts and adjust the leaf or spread it out more smoothly, or the like.

It has been stated above that the tobacco leaves reach not quite around the circumference of the drum, and that successive leaves must all be inserted at the same point of the rotation of the drum in order for them to be exactly superposed and evenly booked. In order to accomplish this, the means next to be described are provided for causing the drum and other parts of the machine to stop at the end of each complete rotation, because of the throwing out of the clutch, and to always stop in exactly the same position of the drum, ready for the insertion of a new leaf. The drum shaft 14 has at the right hand end of the machine outside the side frame 10 an arm 93 projecting radially from said shaft and having at its end a pin 94 projecting toward the side frame. Upon the side frame 10 and at the outer side of the same, next to the arm 93, and lying between said arm and the side frame, is pivoted, as at 95, a latch 96 adapted to swing vertically between stops 112, 113. This latch provides at its end farthest from its fulcrum 95 a tubular slideway 97, and in said slideway is a plunger 98 thus adapted to slide longitudinally of the arm 96 and in its outermost position to project beyond said arm. The projecting portion of the plunger 98, when projected from the slideway 97, as shown in Fig. 9, lies in the path of the pin 94, as the arm 93 rotates with the drum, and is thus engaged thereby. This engagement of the arm 93, or its pin 94, with the plunger 98 swings the latch 96 upon its pivot 95 and thus pulls upward a connecting rod 99 which extends from said latch 96 downward to the outer end of the substantially horizontal arm 100 of a bell-crank lever 101 pivoted upon a bracket 102 at the inside of the right-hand side frame 10. The other arm of this bell-crank lever 101 projects upward, and engages at its end in the recess of a hook 103 upon the under side of the connecting rod 92. Thus as the connecting rod 99 is pulled upward, the connecting rod 92 is slid from hight to left of the machine, which movement, as before described, throws the clutch out. The drum therefore stops, with the rest of the machine, as soon as its arm 93 hits the plunger 98. After a new leaf has been brought into position for insertion and it is desired to again start the machine and rotation of its drum, the plunger 98 must obviously be retracted to release the arm 93 and thus permit the drum to turn, as well as allow the latch 96 to drop and the spring 104 to throw the clutch into engagement. This is done by means of lever 105, which is fulcrumed at its middle upon the side frame 10 of the machine just below the latch 96 and has one of its opposite arms, as 106, engaging by a slot-and-pin connection the rear end of the plunger 98. The other opposite arm 107 is connected by a spring 108 to a fixed portion of the side frame, whereby the plunger 98 is normally projected. The fulcrumal pin 109 of the lever 105 is fixed thereto and projects rearwardly through the side frame 10, where it carries a fixed arm 114 which is connected by rod 110 to a treadle 111 at the right hand side of the bottom part of the machine or its supporting frame. By depressing this treadle 111 by his right foot, therefore, the operator can withdraw the plunger 98 and start the machine upon a new complete rotation. If at any time during such rotation, he wishes to stop the machine, or its drum, he uses the left treadle as has been described, and otherwise or in any event the drum stops at the completion of a rotation unless the right treadle is depressed.

The shaft 25 upon which the cutter 26 is mounted, is adapted to be slid longitudinally toward the left hand side of the machine by means of a handle or finger piece 116, and the hub of the cutter 26 has a bayonet-joint slot 117 adapted to receive the pin 118 on said shaft 26. The purpose of this construction is that when the cutter is in position in the slot of the drum, its shaft can be twisted slightly so as to free the pin 118 from the slot 117 and then slid longitudinally out of the cutter, and the cutter can then be easily removed and replaced by another, it being sometimes desirable to employ cutters of different thicknesses according to the sizes of the ribs of the tobacco leaves.

The apron 40 carries upon its end pieces 42 inwardly projecting stop pins 119 adapted to engage the front edges of the side frames 10 when the apron is tipped forwardly downward, and thus arrest such tipping. It will be understood that the apron is thus tipped down to expose the ends of the books of tobacco leaves, when completed, and then by starting the machine said books are readily discharged into the hands of the operator.

It should be carefully noted that the large gear 73, although mounted upon the same shaft 14 with the drum, is loose upon said shaft with respect to the drum. There is thus no connection between the movements of the gear 73 and the drum because of their being upon the same shaft, and said shaft 14 serves simply as a pivot for the gear to revolve upon.

The driving chain 52 upon the sprockets 50 and 51 passes also around idle flanged rollers 120 and 121, so as to direct it out of the way of the lever 86 and other parts. Furthermore, this chain is slack, or longer than necessary to reach around both sprocket wheels and the idlers and be taut, so as to permit forward tipping of the apron 40. Obviously, if the chain was taut, throughout its length, said apron could not be swung away from the drum, but because of the slackness described, the chain 52 in operation is tight only at its lower run which is doing the work and its upper run hangs loose or slack between the sprocket wheels 50 and 51, as indicated by the heavy broken line in Fig. 2.

A stop 122, at the opposite side of the lever 105 from the lower stop 113 for the latch 96, serves therewith to limit swinging of said lever 105.

Having thus described the invention, what we claim is—

1. A tobacco stemming machine comprising means for moving the leaf in the direction of its stem, means for stretching said leaf in a direction transverse to said stem laterally to expand said stem, and means for longitudinally dividing said leaf on opposite sides of said stem while held stretched.

2. A tobacco stemming machine comprising a rotatable drum receiving and supporting the leaf to be stemmed, means for rotating said drum, means for stretching said leaf in a direction transverse to the stem laterally to expand said stem, and means for longitudinally dividing said leaf on opposite sides of said stem while held stretched.

3. A tobacco stemming machine comprising a rotatable drum receiving and supporting the leaf to be stemmed, means for rotating said drum, means coacting with said drum for stretching said leaf in a direction transverse to the stem laterally to expand said stem, and means for longitudinally dividing said leaf on opposite sides of said stem while held stretched.

4. A tobacco stemming machine comprising a rotatable drum receiving and supporting the leaf to be stemmed, means for rotating said drum, means for longitudinally dividing said leaf on opposite sides of said stem, and means engaging said leaf directly in front of said dividing means for stretching said leaf in a direction transverse to said stem laterally to expand said stem.

5. A tobacco stemming machine comprising a rotatable drum, two circumferential flanges thereon having cutting edges, means for rotating said drum, means for stretching the leaf across said flanges laterally to expand the stem, and a cutter coacting with said flanges to divide said leaf longitudinally on opposite sides of the stem while held stretched.

6. A tobacco stemming machine comprising a rotatable drum, two circumferential flanges thereon having cutting edges, means for rotating said drum, means for stretching the leaf across said flanges laterally to expand the stem, and a rotary cutter entering between said flanges and coacting therewith to divide said leaf longitudinally on opposite sides of the stem while held stretched.

7. A tobacco stemming machine comprising a rotatable drum receiving and supporting the leaf to be stemmed, means for rotating said drum, means coöperating with said drum to hold the leaf thereon and stretch said leaf in a direction transverse to said drum laterally to expand the stem, and means for longitudinally dividing said leaf on opposite sides of the stem while held stretched.

8. A tobacco stemming machine comprising a rotatable drum, two circumferential flanges thereon having cutting edges, means for rotating said drum, means on said drum for stretching said leaf across said flanges laterally to expand the stem, and a rotary cutter coacting with said flanges to divide said leaf longitudinally on opposite sides of the stem while held stretched.

9. A tobacco stemming machine comprising a rotatable drum receiving and supporting the leaf to be stemmed, two transversely flexible driving belts on said drum, means for rotating said drum, two circumferential flanges on said drum having cutting edges and disposed between and in proximity to said belts, and a rotary cutter coacting with said flanges to divide the leaf; the said driving belts being open on the feed side of the drum and engaging the leaf on opposite sides of said flanges.

10. A tobacco stemming machine comprising a rotatable drum receiving and supporting the leaf, means coacting with said drum for dividing the leaf in a longitudinal direction on opposite sides of the stem, rollers parallel to said drum, and driving belts for said drum passing around said rollers.

11. A tobacco stemming machine comprising a rotatable drum, two circumferential flanges thereon having cutting edges, a rotary cutter coacting with said flanges to divide the leaf longitudinally on opposite sides of said stem, two transversely flexible belts passing around a portion of the drum periphery and having their inner edges in proximity to the outer faces of said flanges, and supporting rollers for said belts: one of said rollers being located directly in front of said cutter.

12. A tobacco stemming machine comprising a rotatable drum, two circumferential flanges thereon having cutting edges, a rotary cutter coacting with said flanges to divide the leaf longitudinally on opposite sides of said stem and disposed in front of a vertical plane passing through the axis of rotation of said drum, two transversely flexible belts passing around a portion of the drum periphery and having their inner edges in proximity to the outer faces of said flanges, and two supporting rollers for said belts: both of said rollers being disposed in front of said vertical plane, and one of said rollers being located directly in front of said cutter.

13. A tobacco stemming machine comprising a rotatable drum receiving and supporting successively fed superposed leaves, means for removing the stem of each leaf in turn as it is fed to said drum, and means for rotating said drum at a speed proportional to the increase in thickness of the layer of superposed leaves.

14. A tobacco stemming machine comprising a rotatable drum receiving and supporting successively fed superposed leaves, means for removing the stem of each leaf as it is fed to said drum, belts normally in contact with said drum periphery, means for driving said belts to rotate said drum, and means for regulating the tension of said belts conformably to variation in the distance of the contact area of said belts from the axis of rotation of said drum, due to the introduction of said leaves between said belts and the drum surface.

15. A tobacco stemming machine comprising a supporting frame, a drum rotatable in said frame and receiving and supporting successively fed superposed leaves, means for removing the stem of each leaf in turn as it is fed to said drum, belts normally in contact with said drum periphery, means for driving said belts, a plurality of bell-crank levers pivoted in line on said supporting frame, rollers over which said belts pass journaled on corresponding arms of each of said bell-crank levers, and adjustable weights supported on the other arms of said levers.

16. A tobacco stemming machine comprising a rotatable drum receiving and supporting the leaf, circumferential flanges on said drum, means for dividing the leaf longitudinally on each side of the stem, and means for driving said drum and for engaging said leaf and stretching the same across said flanges during the operation of said dividing means.

17. A tobacco stemming machine comprising a rotatable drum receiving and supporting the leaf, circumferential flanges on said drum, means for dividing the leaf longitudinally on each side of the stem, and two belts driving said drum, open on the feed side of the machine and engaging said leaf and stretching the same across said flanges during the operation of said dividing means.

18. A tobacco stemming machine comprising a circumferentially slotted rotatable booking drum, a cutter working is said slot, a rotatable stem ejector also working in said slot and in rear of said cutter, belts for rotating said drum, and means for rotating said ejector independently of said drum.

19. A tobacco stemming machine comprising a rotatable drum, means for rotating said drum, flanges on the periphery thereof dished toward one another and having cutting edges, and a rotary cutter disposed between said flanges and coacting with said cutting edges.

20. A tobacco stemming machine comprising a rotatable drum, means for rotating said drum, flanges on the periphery thereof dished toward one another and having their outer circumferential edges beveled, a rotary disk having arms disposed between said flanges, and cutting blades on said arms coacting with said flange edges.

21. A rotating cutter for tobacco stemming machines comprising a disk having arms, the forward or cutting faces of which are grooved and also curved eccentrically to the center of said disk.

22. A rotating cutter for tobacco stemming machines comprising a disk having arms, the forward or cutting faces of which are grooved and also curved eccentrically to the center of said disk, and thin metal blades secured on opposite sides of said disk.

23. A tobacco stemming machine comprising a supporting frame, a rotatable drum mounted in said frame, circumferential flanges on said drum having cutting edges, a rotary cutter coacting with said flange edges, a shaft in said frame in non-rotatable engagement with said cutter and being longitudinally removable from such engagement, means for releasably holding said shaft against longitudinal movement, and means for rotating said drum and cutter.

24. A tobacco stemming machine comprising a supporting frame, a rotatable drum mounted in said frame, circumferential flanges on said drum having cutting edges, a rotary cutter coacting with said flanges and having a hub with a bayonet joint slot therein, a shaft in said frame extending through said rotary cutter and being longitudinally removable from the same, a pin on said shaft adapted to enter the bayonet joint slot of the cutter, and means for rotating said drum and cutter.

25. A tobacco stemming machine comprising a supporting frame, a drum rotatably mounted in said frame, an apron in front of said drum and hinged at its lower part to said frame, a belt roller journaled in said apron, other belt rollers mounted in the frame, belts extending around said belt rollers and lying against the drum, take-up means for said belts, and means for driving said belts to rotate said drum.

26. A tobacco stemming machine comprising a supporting frame, a drum rotatably mounted in said frame, a shaft journaled in said frame in front of said drum, an apron above said shaft and hinged at its lower part to said frame, downwardly extending arms at the opposite ends of said apron, other arms fast on said shaft, links connecting said shaft arms and apron arms, a handle on said shaft, a belt roller journaled in said apron, other belt rollers mounted in said frame, belts extending around said belt rollers and lying against the drum, take-up means for said belts, and means for driving said belts to rotate said drum.

27. A tobacco stemming machine comprising a supporting frame, a drum rotatably mounted in said frame, an apron in front of said drum and hinged at its lower part to said frame, a belt roller journaled in said apron, other belt rollers mounted in said frame, belts extending around said belt rollers and lying against the drum, a rotary brush mounted in said apron and wiping said belts, motion transmitting mechanism between said rotary brush and the roller in said apron, and means for driving said belts to rotate said drum.

28. A tobacco stemming machine comprising a supporting frame, a drum rotatably mounted in said frame, an apron in front of said drum and hinged at its lower part to said frame, said apron having in its upper part a longitudinal slot, an idle roller mounted inside said apron and projecting through said slot, a belt roller in said apron, other belt rollers mounted in the frame, belts extending around said belting rollers and lying against the drum, take-up means for said belts, and means for driving said belts to rotate said drum.

29. A tobacco stemming machine comprising a supporting frame, a drum rotatably mounted in said frame, an apron in front of said drum and hinged at its lower part to said frame, a shaft mounted in said apron and projecting therefrom at one end, a belt roller on said shaft inside the apron, other belt rollers mounted in the frame, belts extending around said belt rollers and lying against the drum, take-up means for said belts, a sprocket wheel on said shaft end which projects from the apron, a driving sprocket, and a slack chain extending over said sprockets.

30. A tobacco stemming machine comprising a supporting frame, a drum rotatably mounted in said frame, an apron in front of said drum and hinged at its lower part to said frame, adjustable stops limiting the swinging of said apron toward said drum, a belt roller in said apron, other belt rollers mounted in the frame, belts extending around said belt rollers and lying against the drum, take-up means for said belts, and means for driving said belts to rotate said drum.

31. A tobacco stemming machine comprising a supporting frame, a drum rotatably mounted in said frame, brackets pivoted to said frame above said drum, a belt roller mounted in said brackets, other belt rollers mounted in the frame, belts extending around said belt rollers and lying against the drum, take-up means for said belts, and means for driving said belts to rotate said drum.

32. A tobacco stemming machine comprising a supporting frame, a circumferentially slotted drum rotatably mounted in said frame, brackets pivoted to said frame above said drum, a belt roller mounted in said brackets and having an annular groove opposite the slot of the drum, a rotary cutter disposed in rear of said grooved roller and working in said slot, other belt rollers mounted in the frame, belts extending around said belt rollers and lying against the drum, take-up means for said belts, and means for driving said belts to rotate said drum.

33. A tobacco stemming machine comprising a supporting frame, a circumferentially slotted drum rotatably mounted in said frame, brackets pivoted to said frame above said drum, a belt roller mounted in said brackets and having an annular groove opposite the slot of the drum, a transverse rod or bar between said brackets, a fixed cleaning finger entering said groove, other belt rollers mounted in the frame, belts extending around said belt rollers and lying against the drum, take-up means for said belts, and means for driving said belts to rotate said drum.

34. A tobacco stemming machine comprising a supporting frame, a drum rotatably mounted in said frame, brackets pivoted to said frame above said drum, adjustable stops limiting the downward swinging of said brackets, a roller mounted in said brackets, other belt rollers mounted in the frame, belts extending around said belt rollers and lying against the drum, take-up means for said belts, and means for driving said belts to rotate said drum.

35. A tobacco stemming machine comprising a circumferentially slotted drum, means for rotating said drum, a rotary cutter working in the slot of said drum at the upper part thereof, and a stem ejector in disk form having teeth on its periphery working in said slot at the lower part thereof.

36. A tobacco stemming machine comprising a supporting frame, a shaft, a circumferentially slotted drum mounted on said shaft, belts for rotating said drum, a loose gear on said shaft, a stem ejector shaft mounted in the frame, a stem ejector on said shaft working in the slot of the drum, a gear on said stem ejector shaft engaging said loose gear, and means for driving said loose gear.

37. A tobacco stemming machine comprising a frame, a drum rotatably mounted in said frame, means for rotating said drum, a radial arm rotating with said drum, a latch hinged on the frame to swing in a vertical plane, a driving shaft, fast and loose clutch members on said shaft engaging with one another, connecting means between one of said clutch members and said latch adapted to throw out the clutch when the stop dog of the latch is engaged by the drum arm, means for retracting said dog, a spring engaging said retracting means and normally projecting said dog, and means normally throwing the clutch members into engagement with each other.

38. A tobacco stemming machine comprising a drum receiving the leaves to be booked, means for rotating said drum and for retaining said booked leaves thereon, and means for dividing said leaves longitudinally on opposite sides of and in proximity to the stem.

39. A tobacco stemming machine comprising a drum receiving the leaves to be booked, means for rotating said drum and for retaining said booked leaves thereon, peripheral cutters on said drum receiving the stem between them, and a rotary cutter coacting with said peripheral cutters to divide said leaves longitudinally on opposite sides of and in proximity to said stem.

MARTIN DEILLER.
EUGENE M. DEILLER.

In the presence of—
CHARLES P. DAY,
JOSEPH H. GAY.

DISCLAIMER.

985,984.—*Martin Deiller* and *Eugene M. Deiller*, Newark, N. J. TOBACCO STRIPPING AND BOOKING MACHINE. Patent dated March 7, 1911. Disclaimer filed April 24, 1918, by the assignee, *Universal Tobacco Machine Company*.

Enters this disclaimer—

"To that part of the specification, page 1, lines 13 to 35, which is in the following words:

"The principle of the invention is as follows: The tapering stem or mid-rib of a tobacco leaf, for a considerable portion of its length from point to butt, is longitudinally creased or folded. By stretching the leaf transversely, this fold may be flattened out, so that the width of this portion of the stem may thus be increased and approximated to that of the thick or butt portion of the stem which is sufficiently solid to resist such strain. In this way, the width of the whole stem is made so nearly uniform, that if the stretched leaf be divided by two parallel cuts respectively on opposite sides of the stem, and separated by a distance equal to the width of said thick or butt portion, the amount of leaf left on the stem, even near the point thereof, will be practically inconsiderable: or, in other words, the stemming of the leaf will be accomplished without substantial loss.

"In order to carry this principle into useful effect;

"also to that part of the specification, page 1, lines 47–48, which is in the following words:

"thus flattening out the fold in the stem;

"also that part of the specification, page 2, lines 114–117, which is in the following words:

"This stretching opens the longitudinal fold in the stem, thus flattening the stem, and increasing its width;

"also to that part of the specification, page 2, line 121, to page 3, line 3, which is in the following words:

"But because the otherwise narrow part of the stem toward the point has been stretched to widen the stem before the cuts are made, the width of the whole stem is substantially equalized, so that the amount of leaf left on said stem becomes inconsiderable. The stretching operation flattens all that part of the stem in which the fold exists, and does not, of course, widen the normally solid unfolded or butt part. The flanges are set at a suitable distance apart to permit this butt portion to enter between them.

"also to any interpretation of the expression 'laterally to expand said stem,' as employed in the first eight claims of said Letters Patent, which will include any expansion of said stem beyond such expansion as the stretching of the leaf referred to in said claims actually produces in the machine described."

[*Official Gazette April 30, 1918.*]